United States Patent
Sauber et al.

(10) Patent No.: US 8,645,811 B2
(45) Date of Patent: Feb. 4, 2014

(54) SYSTEM AND METHOD FOR SELECTIVE ERROR CHECKING

(75) Inventors: William Sauber, Georgetown, TX (US); Ayedin Nikazm, Austin, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 13/283,051

(22) Filed: Oct. 27, 2011

(65) Prior Publication Data

US 2013/0111308 A1 May 2, 2013

(51) Int. Cl.
*G06F 11/10* (2006.01)
*H03M 13/00* (2006.01)

(52) U.S. Cl.
USPC .............................. 714/807; 714/48; 714/801

(58) Field of Classification Search
USPC .......................................... 714/48, 801, 807
See application file for complete search history.

(56) References Cited

U.S. PATENT DOCUMENTS

| | | | | |
|---|---|---|---|---|
| 5,289,477 A | * | 2/1994 | Lenta et al. | 714/758 |
| 5,606,662 A | * | 2/1997 | Wisor | 714/48 |
| 7,694,093 B2 | | 4/2010 | Shaw et al. | |

* cited by examiner

*Primary Examiner* — Sam Rizk
(74) *Attorney, Agent, or Firm* — Haynes and Boone, LLP

(57) ABSTRACT

A method of selectively enabling error checking in an information handling system, including receiving information indicating that data associated with a first memory portion in a system memory should be subject to error checking during transmission between the memory controller and the system memory and indicating that data associated with a second memory portion in the system memory should be free of error checking during transmission between the memory controller and the system memory, receiving a memory access request directed to one of the first and second memory portions, transmitting data between the memory controller and the system memory in response to the memory access request, and selectively performing an error checking technique on the transmitted data based on the information.

20 Claims, 8 Drawing Sheets

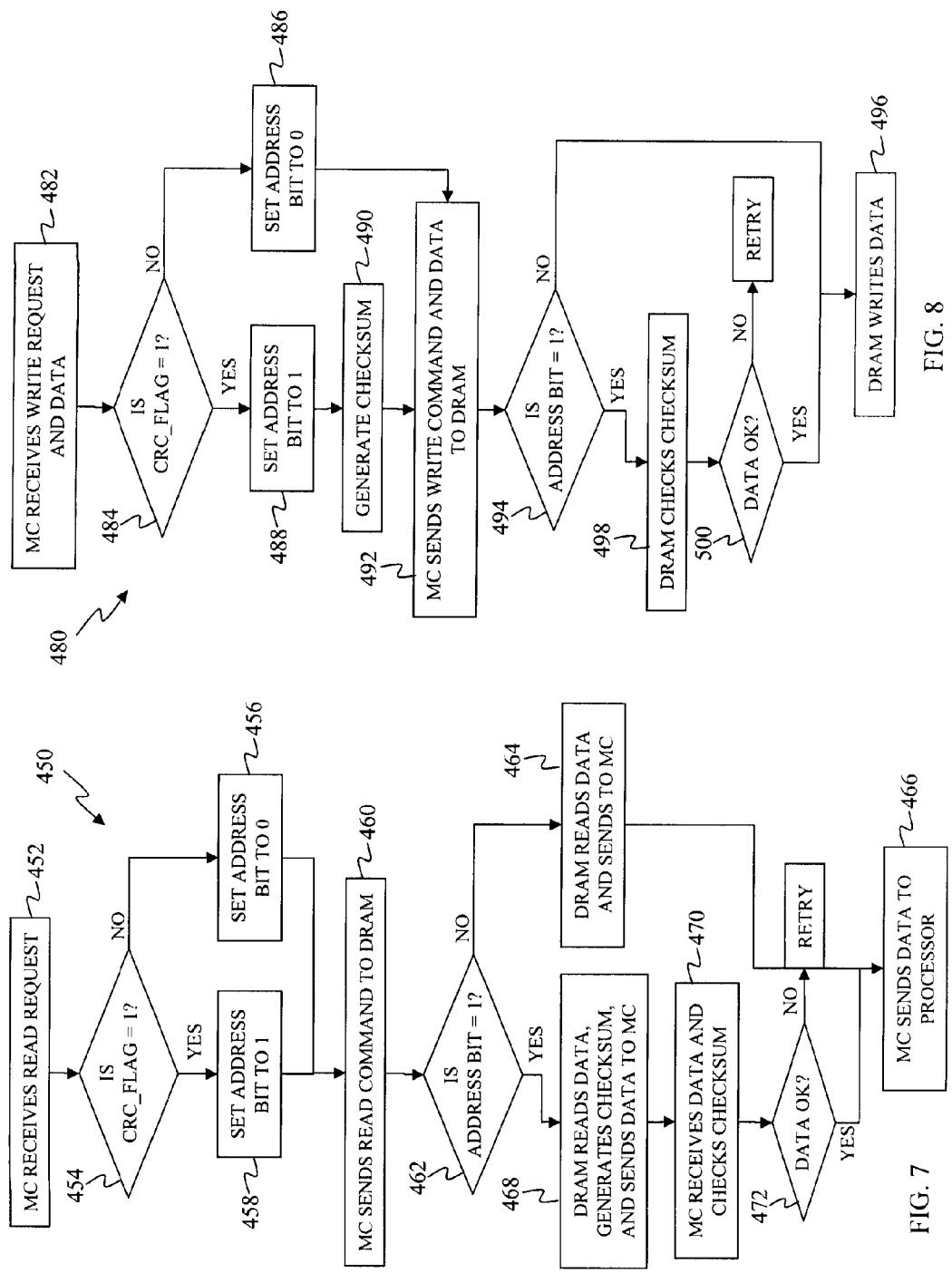

SYSTEM AND METHOD FOR SELECTIVE ERROR CHECKING

BACKGROUND

The present disclosure relates generally to information handling systems, and more particularly to a memory compatibility system and method.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Currently, it is common for an IHS that handles critical data to implement some form of error checking to detect data transmission errors as data is passed between various components in the IHS. The cyclic redundancy check (CRC) is an error detection technique commonly employed for this purpose. In the CRC technique, the integrity of data is verified through the use of a checksum based on the data itself. Specifically, a data sender using the CRC technique generates a checksum based on the data to be transmitted and appends it to the data before transmission. Upon receipt of the data, a data receiver uses the checksum to determine whether or not the data was corrupted during transmission. Because the CRC checksum is appended to the data as it is transmitted, this technique incurs some amount of overhead in the form of lost memory channel bandwidth, extra latency, and extra power per data byte transmitted within a system. Accordingly, although data transmission error checking in IHSs has been generally satisfactory, it has not been satisfactory in all respects.

SUMMARY

According to one embodiment a method of selectively enabling error checking in an information handling system (IHS) that includes a memory controller and a system memory includes receiving, at the memory controller, information indicating that data associated with a first memory portion in the system memory should be subject to error checking during transmission between the memory controller and the system memory and indicating that data associated with a second memory portion in the system memory should be free of error checking during transmission between the memory controller and the system memory, receiving, at the memory controller, a memory access request directed to one of the first and second memory portions, transmitting data between the memory controller and the system memory in response to the memory access request, selectively performing an error checking technique on the transmitted data based on the information if the memory access request is directed to the first memory portion and including transmitting the data without performing the error checking technique if the memory access request is directed to the second memory portion.

BRIEF DESCRIPTION OF THE DRAWINGS

FIG. 7 is a flow chart illustrating a method of selectively enabling CRC error checking when a memory controller receives a data read request according to aspects of the present disclosure.

FIG. 8 is a flow chart illustrating a method of selectively enabling CRC error checking when a memory controller receives a data write request according to aspects of the present disclosure.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various components may be arbitrarily drawn in different scales for the sake of simplicity and clarity.

In addition, for purposes of this disclosure, an information handing system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, a mobile communication device, or any other suitable device. The IHS may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
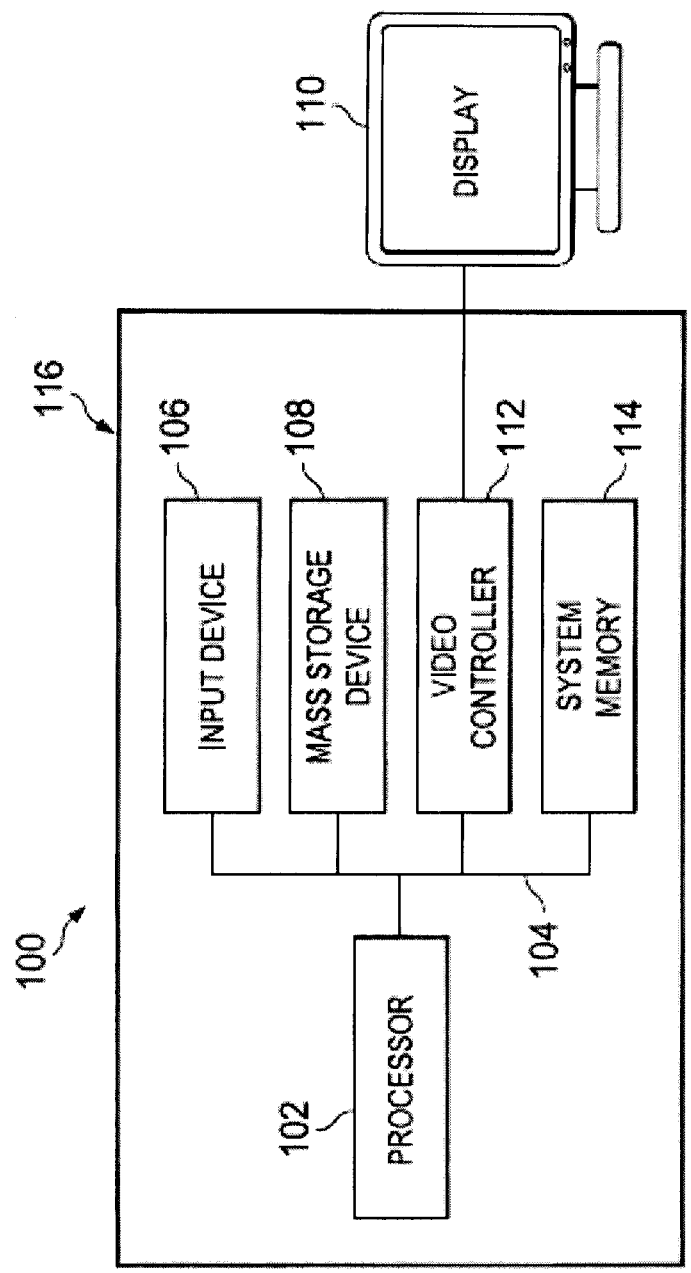
FIG. 1 is a simplified block diagram of an example information handling system (IHS).

In one embodiment, an IHS 100 shown in FIG. 1 includes a processor 102, which is connected to a bus 104. Bus 104 serves as a connection between processor 102 and other components of IHS 100. An input device 106 is coupled to processor 102 to provide input to processor 102. Examples of input devices may include keyboards, touch-screens, pointing devices such as mice, trackballs, and track-pads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
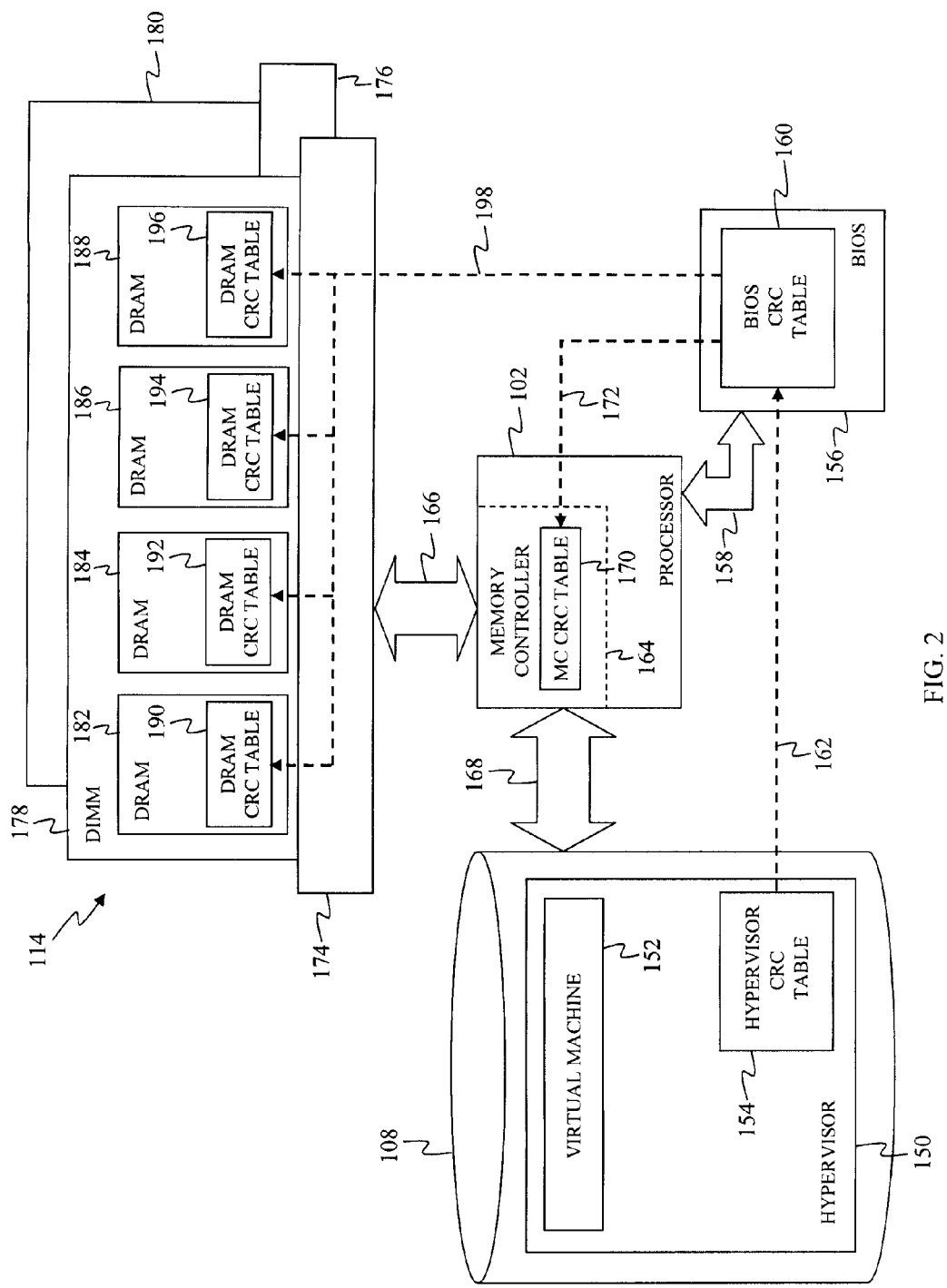
FIG. 2 is a functional block diagram of a portion of the IHS of FIG. 1 including the processor, the mass storage device, and the system memory.

FIG. 2 is a functional block diagram of a portion of the IHS 100 of FIG. 1 including the processor 102, the mass storage device 108, and the system memory 114. In general, the IHS 100 is configured to selectively enable error checking for data flowing to and from the system memory 114. For instance, the IHS 100 may enable error checking for data critical to system operation and disable error checking for non-critical data. Because error checking typically incurs an overhead penalty, such selective checking may lessen the impact of error checking on system performance and reduce power consumption. As is known by one of ordinary skill in the art, a common error checking technique is the cyclic redundancy check (CRC). In the illustrated embodiment, the IHS 100 is operable to selectively enable CRC for data transmitted between the processor 102 and system memory 114.

In the illustrated embodiment, the mass storage device 108 includes virtualization software (i.e. a hypervisor) 150. The hypervisor 150 may be any type of hypervisor such as VMWare ESX®, Microsoft Hyper-V®, or Xen®, or another hypervisor. As shown, a virtual machine (persona) 152 may be instantiated in the hypervisor virtual environment. The hypervisor 150 allocates portions of system memory 114 for the virtual machine 152 and for the supporting virtual resources. Although the hypervisor 150 and virtual machine 152 are shown as residing in storage device 108, it is understood that active portions of this software may reside in system memory 114. In the illustrated embodiment, the hypervisor 150 is operable to segment the allocated memory into critical regions and non-critical regions. For example, the hypervisor 150 may designate memory allocated for components such as kernels, drivers, and kernel buffers as critical and designate memory allocated for components such as processes in virtual machine 152 and user data as non-critical. The IHS 100 is operable to selectively enable CRC error checking based on the hypervisor's segmentation of critical and non-critical data. To this end, the hypervisor 150 includes a hypervisor CRC table 154 that denotes which portions of system memory 114 are reserved for critical data and thus should be subject to CRC error checking and which portions of system memory 114 are reserved for non-critical data and thus should not be subject to CRC error checking. An example of the hypervisor CRC table 154 is shown in Table 1 below:

TABLE 1

| Byte Offset | CRC Entry | | CRC Entry | | CRC Entry | | CRC Entry | | Memory Address Range |
|---|---|---|---|---|---|---|---|---|---|
| | Read CRC | Write CRC | Read CRC | Write CRC | Read CRC | Write CRC | Read CRC | Write CRC | |
| 0 | 0/1 | 0/1 | 0/1 | 0/1 | 0/1 | 0/1 | 0/1 | 0/1 | $0\text{-}(2^{33}-1)$ |
| 1 | 0/1 | 0/1 | 0/1 | 0/1 | 0/1 | 0/1 | 0/1 | 0/1 | $2^{33}\text{-}(2^{34}-1)$ |
| ... | ... | ... | ... | ... | ... | ... | ... | ... | ... |
| 1023 | 0/1 | 0/1 | 0/1 | 0/1 | 0/1 | 0/1 | 0/1 | 0/1 | $(2^{45}-2^{33})\text{-}(2^{45}-1)$ |

In the example Table 1, each row corresponds to a memory address range reserved by the hypervisor 150. Each address range is split into four portions for which CRC may be enabled or disabled when reading and writing data into that memory portion. Thus, a pair of table cells in adjacent columns marked 'Read CRC' and 'Write CRC' constitute a single CRC entry. Each entry consists of two bits—a first '0' or '1' indicating whether data being read from the associated memory portion will be subject to CRC error checking and a second '0' or '1' indicating whether data being written to the associated memory portion will be subject to CRC error checking. Accordingly, each row of the table includes 8 bits (1 byte). In this manner, CRC checking may be independently enabled or disabled for reading and writing to the same memory portion. In the illustrated example, each CRC entry (bit pair) covers 2 gigabytes (GB) of memory, and thus a row covers an 8 GB memory range, and all 1024 rows of the table together cover 8 terabytes (TB). It should be understood that a table with a fixed entry size of 2 GB was selected for the above example simply for the sake of clarity. In that regard, 2 GB represents the maximum size of a bank in the proposed Double Data Rate Four (DDR4) DIMM standards to be promulgated by the Joint Electron Devices Engineering Council (JEDEC). Accordingly, this example is not limiting and, in alternative embodiments, each CRC entry may cover a different size memory portion and the granularity of each entry may not be fixed. Additionally, in alternative embodiments, the above-described system may include another type of system management software instead of, or in addition to, the hypervisor 150. For instance, the mass storage device may include an operating system with applications installed therein. In such a scenario, the operating system may be operable to segment its allocated memory into critical (e.g. kernel processes) and non-critical regions (e.g. application data) and maintain a CRC table indicating which regions should be subject to CRC error checking.

The IHS 100 further includes a basic input/output system (BIOS) module 156 stored on a non-volatile read-only memory (ROM) chip that is communicatively coupled to the processor 102, the mass storage device 108, and the system memory 114 via an I/O channel 158. The BIOS module 156 includes BIOS firmware that executes on the processor 102 and is operable to detect and identify resources within IHS 100, provide the appropriate drivers for those resources, initialize those resources, and access those resources. The BIOS module 156 further includes memory initialization code to initialize system memory 114. As an aspect of this, the BIOS 156 includes a BIOS CRC table 160 that is a copy of the hypervisor CRC table 154 maintained by the hypervisor 150. As will be described in association with FIG. 4, the hypervisor CRC table 154 is passed to the BIOS 156 during a reboot or configuration change via the system memory 114. A dashed arrow 162 denotes the hypervisor CRC table 154 being copied to the BIOS CRC table 160.

In the illustrated embodiment of FIG. 2, the processor 102 includes an integrated memory controller 164 that manages the flow of data between the system memory 114 and other components in IHS 100 such as the mass storage controller 108. In alternate embodiments, however, the memory controller 164 may be independent from the processor 102. The system memory 114 is communicatively coupled to the processor (and memory controller 164) via a channel 166 that transmits data and command signals between the memory controller 164 and the system memory 114. The mass storage device 108 is communicatively coupled to processor 102 and memory controller 164 via an I/O bus 168 that carries data accessed by the hypervisor 150. The memory controller 164 further includes a memory controller CRC table 170 stored in an onboard register. The memory controller CRC table 170 includes a portion of the contents of the BIOS CRC table 160 (and thus a portion of the hypervisor CRC table 154). Specifically, the memory controller CRC table 170 includes the CRC entries that correspond to the portions of system memory controlled by the memory controller 164. During memory initialization, the BIOS 156 maps the memory address ranges in the BIOS CRC table 160 to physical banks, bank groups, and ranks in the system memory 114 and maps each CRC entry to the appropriate bank in system memory 114. In this manner, the appropriate CRC entries from the BIOS CRC table 160 are passed to the memory controller CRC table 170 during a reboot or configuration. A dashed arrow 172 represents the appropriate CRC entries from the BIOS CRC table 160 being copied to the memory controller CRC table 170.

An example of the memory controller CRC table 170 stored in memory controller 164 is shown in Table 2 below:

TABLE 2

| Rank | Bank Group | Bank | CRC Entry | |
|---|---|---|---|---|
| | | | Read CRC | Write CRC |
| 0 | 00 | 00 | 0/1 | 0/1 |
| 0 | 00 | 01 | 0/1 | 0/1 |
| ... | ... | ... | ... | ... |
| n | 11 | 11 | 0/1 | 0/1 |

In the example Table 2, each row corresponds to a bank controlled by the memory controller. Each bank is one of four banks in a bank group, and each bank group is one of four bank groups in a rank. In this example, the memory controller controls 'n' ranks, with each rank being composed of sixteen banks. Whether the data stored in each bank should be subjected to CRC error checking is indicated by the CRC entry on each row. Accordingly, the CRC entry in the first row of Table 2 denotes whether the memory stored in bank 00 of bank group 00 of rank 0 should be subjected to CRC checking during either reads or writes. As mentioned above, these CRC entries are copied from the BIOS CRC table 160, and depending on the granularity of the CRC entry and the size of the banks, the same entry from the BIOS CRC table may be copied to more than one row. For example, if each CRC entry in the BIOS CRC table covers 2 GB of memory, but each bank only represents 1 GB of memory, the same CRC entry will be copied to two sequential CRC entries in the memory controller CRC table 170.

In the illustrated embodiment, the memory controller CRC table 170 includes all of the CRC entries from the BIOS CRC table 160 as it is the only memory controller in the IHS 100. However, in alternative embodiments, the IHS 100 may include a plurality of processors and a plurality of associated memory controllers where each memory controller includes a CRC table with CRC entries corresponding only to the portion of the system memory 114 controlled by that memory controller. Additionally, in alternative embodiments, the memory portion covered by the CRC entry smaller than a bank in system memory, and thus there may not be a one-to-one correlation of a CRC entry to a bank. In such a case, alternative CRC table configurations may be needed to enable CRC error checking for specific memory portions.

Further, in the illustrated embodiment of IHS 100, the system memory 114 includes Dual In-line Memory Module (DIMM) sockets 174 and 176 that are communicatively coupled to the memory controller 164 via the channel 166. The DIMM sockets 174 and 176 conform to the proposed DDR4 DIMM standards to be promulgated by JEDEC. Alternatively, the sockets 174 and 176 may be single in-line memory module (SIMM) sockets or another type of memory module socket or may conform to a different standard such as the DDR3 SDRAM standard, a future DDR standard promulgated by JEDEC, or another memory standard or proprietary design. The JEDEC DDR3 SDRAM standard as specified in the JEDEC document JESD79-3E (July 2010) is incorporated in its entirety by reference herein.

In the illustrated configuration, DDR4 SDRAM DIMMs 178 and 180 are respectively inserted into the DIMM sockets 174 and 176. Each DIMM 178 and 180 includes a plurality of DRAM chips in which IHS data is stored. In this example, the DIMM 178 includes DRAM chips 182, 184, 186, and 188, which form a single rank—that is, they are accessed simultaneously by the memory controller 164. DRAMs 182, 184, 186, and 188 respectively include DRAM CRC tables 190, 192, 194, and 196 stored in onboard registers. In one embodiment, the DRAM CRC tables are extensions of the DRAM mode registers. Like the memory controller CRC table 170, the DRAM CRC tables contain a portion of the BIOS CRC table 160. However, the DRAM CRC tables 190, 192, 194, and 196 include only those CRC entries associated with the specific rank formed by the DRAM chips 182, 184, 186, and 188. During memory initialization, the BIOS 156 copies the appropriate CRC entries from the BIOS CRC table 170 into each of the DRAM CRC tables, so that every DRAM CRC table is identical. A dashed arrow 198 represents the appropriate CRC entries from the BIOS CRC table 160 being copied to the DRAM CRC tables 190, 192, 194, and 196.

An example of the DRAM CRC tables 190, 192, 194, and 196 stored in the DRAM chips 182, 184, 186, and 188 is shown in Table 3 below:

TABLE 3

| Bank Group | Bank | CRC Entry | |
|---|---|---|---|
| | | Read CRC | Write CRC |
| 00 | 00 | 0/1 | 0/1 |
| 00 | 01 | 0/1 | 0/1 |
| ... | ... | ... | ... |
| 11 | 11 | 0/1 | 0/1 |

The example Table 3 is a subset of the example Table 2 above. Specifically, Table 3 contains sixteen CRC entries—one for each bank in the rank formed by the DRAM chips 182, 184, 186, and 188. Accordingly, the CRC entry in the first row of Table 3 denotes whether the memory stored in bank 00 of bank group 00 stored in one of the DRAM chips on DIMM module 178 should be subject to CRC checking during either reads or writes. Again, it is understood that the above is just an example and in other embodiments a larger or smaller number of DRAM chips may form a rank in system memory 114 and thus a rank may span across multiple DIMM module or a DIMM module may include multiple ranks. Further, in alternate embodiments, the granularity of the CRC entries may be larger or smaller thus affecting the size and/or composition of the DRAM CRC tables.

In operation, when portions of the system memory 114 are accessed via the memory controller 164, the memory controller either enables or disables CRC error checking for the transmission of data between the memory controller and the system memory 114 based on the memory controller CRC table 170 and the DRAM CRC tables 190, 192, 194, 196. In more detail, when the memory controller 164 receives a memory write command for a specific address, the memory controller translates the address into a corresponding bank location and checks the CRC entry for that bank location in the CRC table 170. If the 'CRC Write' bit is a '1' in that CRC entry, the memory controller 164 will generate a CRC checksum based on the data to be written and append the checksum to the data before it is sent over the channel 166 to the system memory 114. When the data and checksum is received by the appropriate DRAM chip, the DRAM chip will check the CRC entry for the same bank in the DRAM CRC table and determine that the data sent by the memory controller should be verified by the CRC checksum. The DRAM chip will use the checksum to determine if the data was corrupted during transmission over the channel 166. If an error is detected, it signals an exception and the data write is retried, or some other corrective action is performed.

Further, when the memory controller 164 receives a read command for a specific address, the memory controller translates the address into a corresponding bank location and sends a read command with the bank location to the appropriate DRAM chip. The DRAM chip extracts the data from the bank and checks the CRC entry for that bank location in the DRAM CRC table. If the 'CRC Read' bit is a '1' in that CRC entry, the DRAM chip will generate a checksum based on the retrieved data and append it to the data before transmission to the memory controller 164 over the channel 166. When the memory controller 164 receives the data and checksum it checks the CRC entry for the same bank in the memory controller CRC table 170 and determines that it needs to check the data for transmission errors using the checksum. If an error is detected, it signals an exception and the data read is retried, or some other corrective action is performed.

It is understood that the above description of error checking using the CRC technique has been simplified for the sake of clarity and the memory controller and DRAM chips may perform additional steps and/or different steps during data transmission. For instance, in some embodiments, the memory controller may implement the DDR4 CRC error checking technique as proposed in the DDR4 specifications to be promulgated by JEDEC. In such a scenario, the DDR4 CRC scheme would be selectively enabled based on the hypervisor CRC table, BIOS CRC table, memory controller CRC table, and DRAM CRC tables. Further, in other embodiments, the IHS 100 may selectively enable another type of error checking based on the CRC tables described above.

Figure 3:
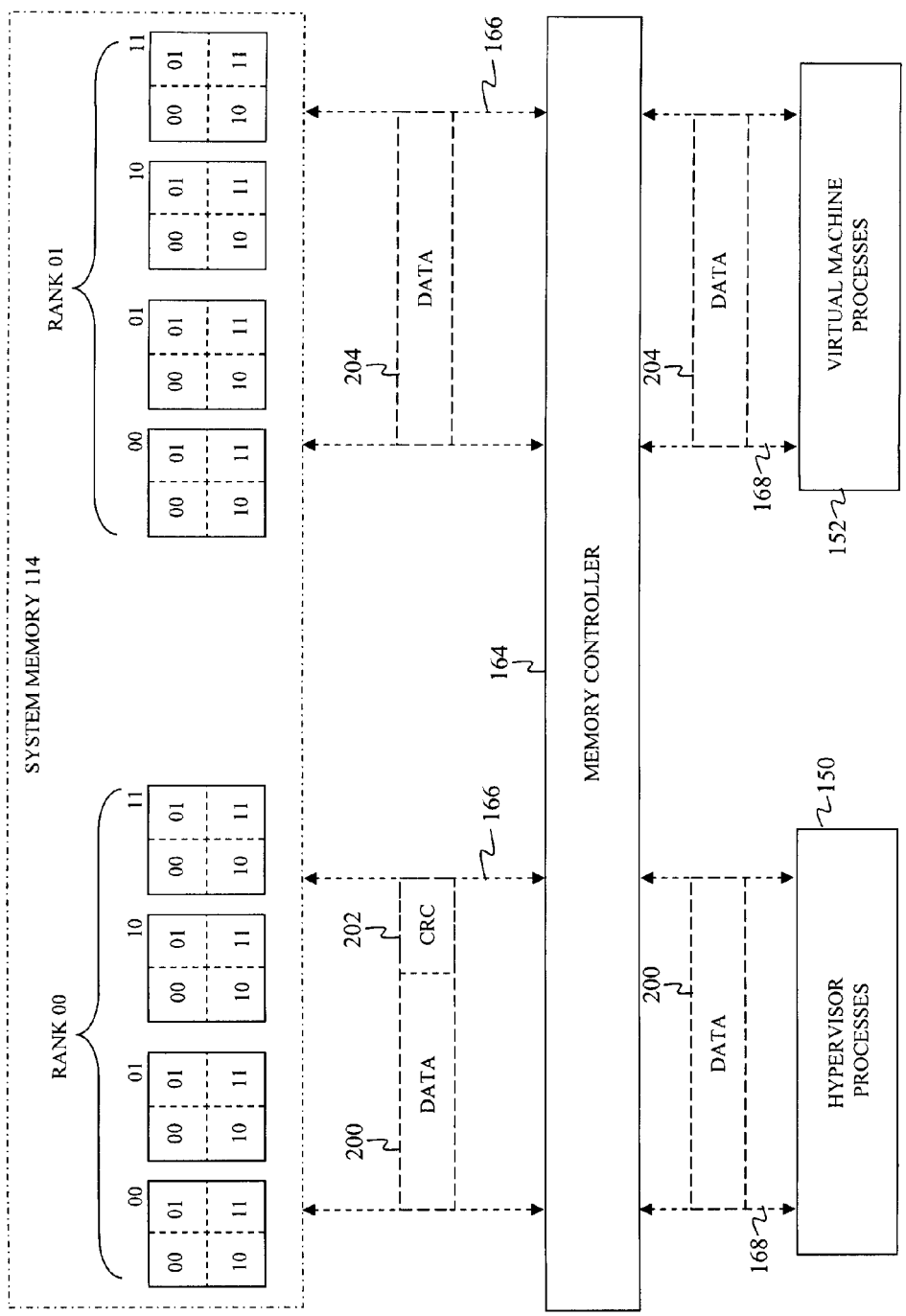
FIG. 3 is a functional block diagram of an example data flow between components in the IHS of FIGS. 1 and 2.

Referring now to both FIG. 2 and FIG. 3, FIG. 3 is a functional block diagram of an example data flow between components in the IHS 100. In the illustrated example of FIG. 3, memory reserved for hypervisor processes has been deemed critical by the hypervisor 150, and memory reserved for virtual machine 152 processes has been deemed non-critical. As such, CRC entries in the hypervisor CRC table 154 corresponding to the memory addresses associated with the hypervisor processes are set to '11' and the CRC entries in the hypervisor CRC table corresponding to the memory addresses associated with virtual machine processes are set to '00'. Upon IHS boot up, the hypervisor CRC table 154 is copied to the BIOS CRC entry table 160 and the BIOS memory initialization code maps the memory addresses passed to it to ranks, bank groups, and banks in the system memory 114. In this simplified example, the memory addresses reserved for the hypervisor processes map to rank 00 and the memory addresses reserved for the virtual machine processes map to rank 01. Thus, CRC error checking will be enabled for data read from or written to any of the sixteen banks in rank 00 and disabled for data being read from or written to any of the sixteen banks in rank 01. For example, a hypervisor process sends data 200 to the memory controller 164 to be written to the system memory 114. The memory controller 164 creates a CRC checksum 202 based on the data 200 and appends it to the data before transmission over the channel 166 to a bank in rank 00. In contrast, if a virtual machine process sends data 204 to the memory controller 164 to store in system memory 114, the memory controller will transmit the data to the appropriate bank in rank 01 without appending a CRC checksum. It should be understood that the illustrated example of FIG. 3 is simply an example and is not limiting. For example, the hypervisor may segment memory into critical and non-critical regions in a different manner, and hypervisor (or operating system) data may be spread across multiple ranks and/or memory controllers.

Figure 4:
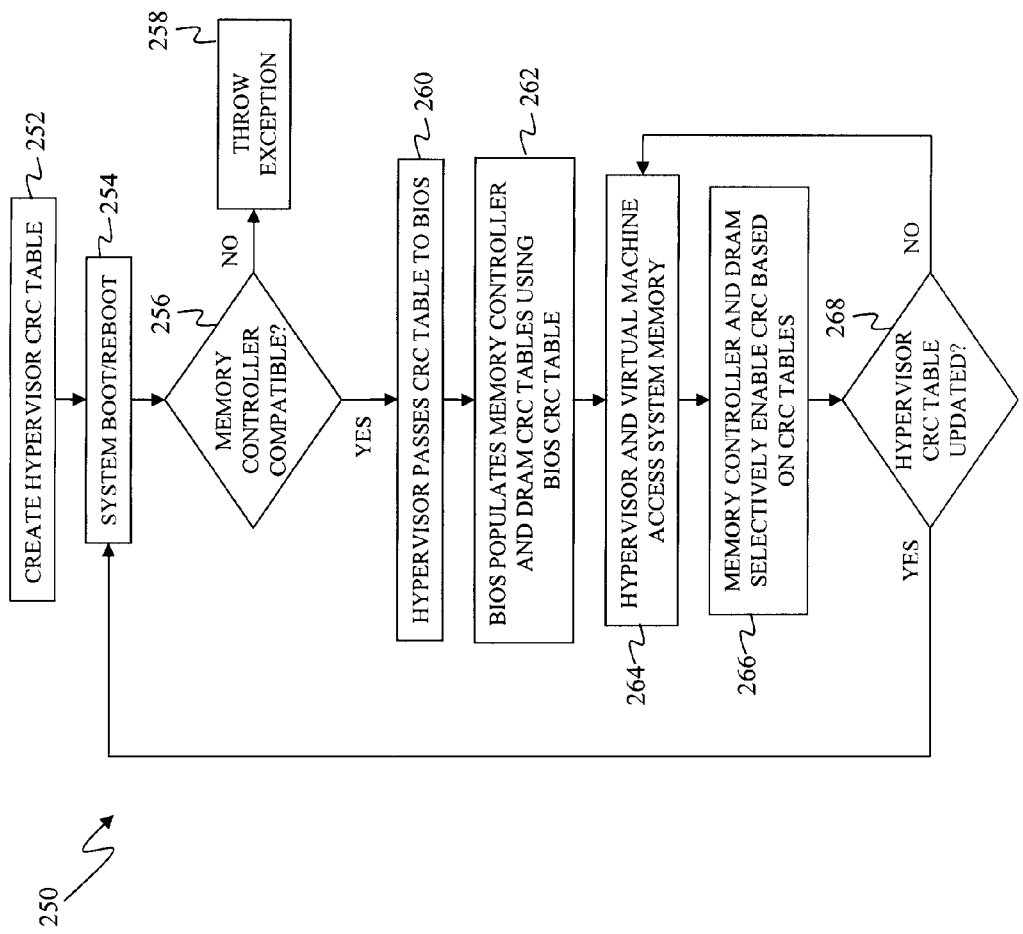
FIG. 4 is a flow chart illustrating a method of selectively enabling error checking in the IHS of FIGS. 1 and 2 according to aspects of the present disclosure.

FIG. 4 is a flow chart illustrating a method 250 of selectively enabling error checking in the IHS 100 according to aspects of the present disclosure. The method 250 begins at block 252 where the hypervisor CRC table 154 is created based on the segmentation of memory addresses into critical and non-critical ranges. Specifically, the two bit CRC entries in the CRC table 154 are set to 00, 01, 10, or 11 based on the criticality of data stored in the memory addresses associated with the CRC entries and whether CRC checking should be enabled for reads, writes, both, or neither. In one embodiment, the creation of the hypervisor CRC table (or operating system CRC table) may be a manufacturing step, but, in other embodiments, the hypervisor CRC table may be created dynamically upon IHS boot up. The method 250 proceeds to block 254 where the IHS is booted, rebooted, or a hot restart is applied. Next, in decision block 256, the BIOS 156 performs a compatibility check to determine if the memory controller 164 is compatible with the CRC selective enablement scheme described in association with FIGS. 2 and 3. For example, if a memory controller accesses data in a non-linear fashion in the system memory, such as through an interleaving technique, the CRC entries in the linearly-addressed CRC tables may not map to the correct banks in the system memory. In other embodiments, different types of compatibility checks may be performed by the BIOS memory initialization code based upon the particular method used to selectively enable CRC. If the memory controller is not compatible with the CRC enablement scheme, the BIOS throws an exception and some corrective action is performed. For example, the BIOS may simply skip any CRC initialization steps or the system may be halted altogether. If the memory controller is compatible, the method 250 proceeds to block 260 where the hypervisor CRC table 154 is passed to the BIOS 156 and copied into the BIOS CRC table 160. Next, in block 262, the memory initialization code in the BIOS 156 populates the memory controller CRC table 170 with the CRC entries associated with the memory range controlled by the memory controller. The initialization code also populates the DRAM CRC tables with the CRC entries associated with the banks in the rank formed by the DRAM chips. The method of populating the memory controller CRC table and DRAM CRC tables is described in greater detail in association with FIG. 5. After the CRC tables have been populated and system initialization is complete, the method 250 proceeds to block 264 where the hypervisor 150 or the virtual machine 152 accesses the system memory 114 during normal IHS operation. In block 266, the memory controller 164 and DRAM chips 182, 184, 186, and 188 selectively enable CRC error checking for data transmitted on channel 166 based on the CRC entries in their respective CRC tables. During normal IHS operation, the BIOS monitors the hypervisor CRC table 154, and, as shown in decision block 268, makes a determination as to whether the hypervisor CRC table has been updated. For instance, the hypervisor (or operating system) may update the hypervisor table 154 dynamically as it allocates, de-allocates, or migrates memory among processes. If the BIOS 156 detects an update to the hypervisor CRC table, the method 250 returns to block 254 and the updated CRC entries are copied to the CRC tables in the memory controller and DRAM chips after the IHS reboots. In alternative embodiments, the updated CRC table may be applied through a system management interrupt (SMI) and take effect without a reboot.

Figure 5:
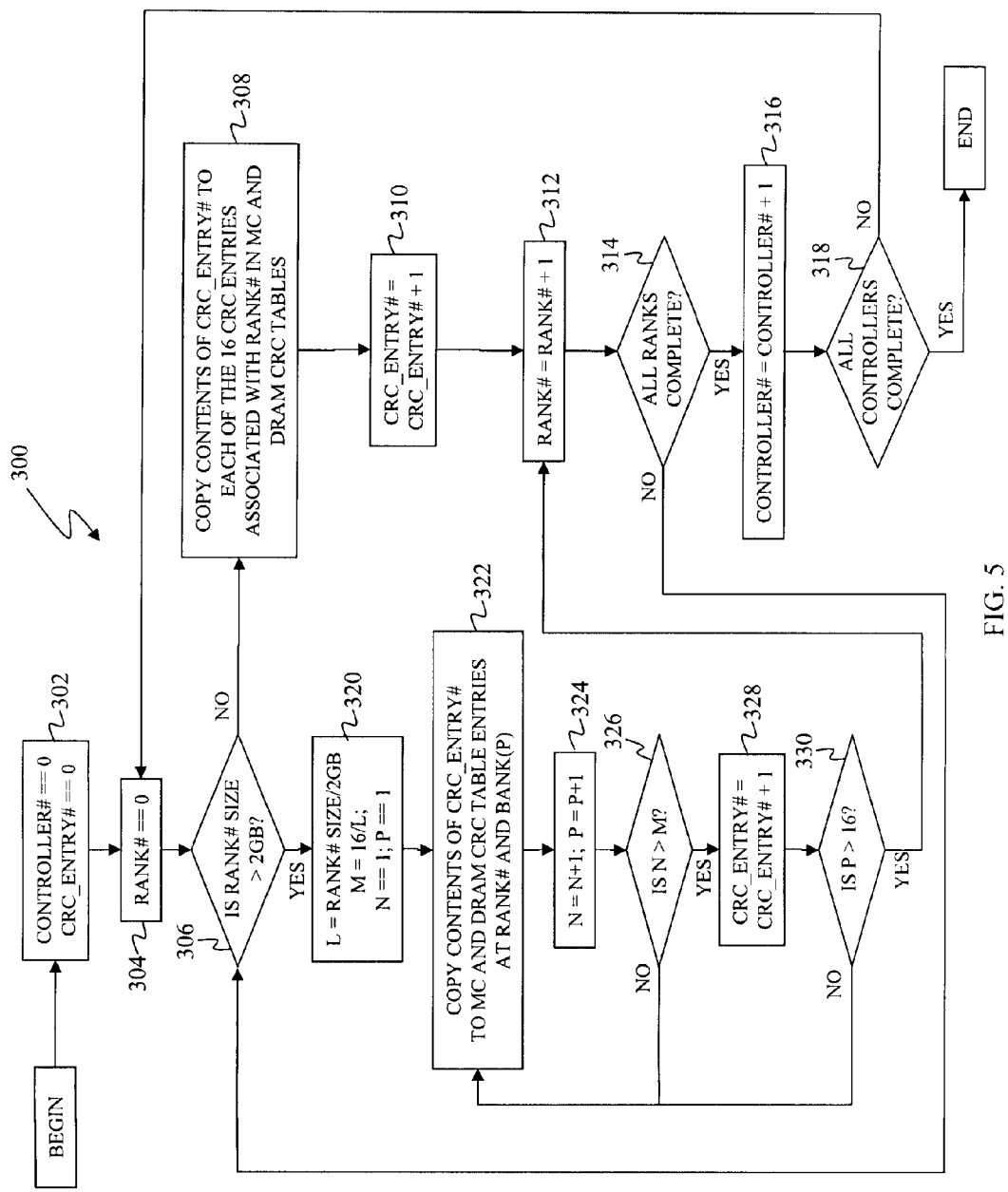
FIG. 5 is a flow chart illustrating a method for populating CRC tables during memory initialization according to aspects of the present disclosure.

FIG. 5 is a flow chart illustrating a method 300 for populating multiple memory controller CRC tables and DRAM CRC tables with CRC entries from the BIOS CRC table (and, hence, the hypervisor CRC table) during memory initialization. The method 300 may be used to populate CRC tables in IHSs having any number of memory controllers, any number of ranks per controller, and any size rank and is not limited to the illustrated embodiment of FIGS. 2 and 3. In one embodiment, the method 300 may be used to populate the memory controller and DRAM CRC tables in block 262 of method 250 in FIG. 4. Further, in some embodiments, the following method may be implemented by the memory initialization code of BIOS 156. For the sake of clarity, the granularity of the CRC entry is again fixed at 2 GB and rank and bank size constraints are based on the proposed DDR4 specifications (i.e. the smallest DDR4 rank is 2 GB and the largest DDR4 bank is 2 GB).

The method 300 begins at block 302 where a variable CONTROLLER# is set to 0 and a variable CRC_ENTRY# is set to 0. CONTROLLER# is a counter that counts up to the total number of memory controllers in the IHS. CRC_ENTRY# is a counter that counts up to the total number of CRC entries in the BIOS CRC table. Next, in block 304, a variable RANK# is set to 0. RANK# is a counter that counts up to the total number of ranks controlled by a specific memory controller. The method 300 then proceeds to decision block 306, where the BIOS 156 determines whether the size of the current rank (RANK#) is larger than 2 GB. If the current rank is not greater than 2 GB (meaning it is equal to 2 GB), the method proceeds to block 308, where the contents of the current CRC entry (CRC_ENTRY#) are copied to each of the 16 CRC entries associated with RANK# (1 CRC entry for all banks) in the CRC table in CONTROLLER#. Also, the contents of CRC_ENTRY# are copied to all 16 CRC entries in the DRAM CRC tables in the DRAM chips that form RANK#. In this branch off of block 306, the same CRC entry is copied 16 times because the CRC entry represents 2 GB and the rank size is also 2 GB. Thus, CRC error checking is enabled or disabled in the same way for each of the 16 banks in the rank. After the memory controller and DRAM CRC tables have been populated with the contents of CRC_ENTRY#, the method proceeds to block 310 where CRC_ENTRY# is incremented by one so that in the next loop the next CRC entry in the BIOS CRC table will be copied to the CRC tables. Next, in block 312, RANK# is incremented by one. Then, in decision block 314, the BIOS determines whether all of the ranks controlled by CONTROLLER# have been completed. If not, the method returns to decision block 306 and it is determined whether the size of the current rank (incremented RANK#) is larger than 2 GB. If all of the ranks have been completed (i.e. RANK# is equal to the total number of ranks controlled by CONTROLLER#), the method proceeds to block 316 where CONTROLLER# is incremented by one. Then, in decision block 318, it is determined whether all of the controllers in IHS have been completed. If not, the method returns to block 304 and RANK# is reset to 0 for the next controller loop. If all of the controllers have been completed (i.e. all CRC entries in the BIOS CRC table have been copied to the memory controller and DRAM CRC tables), the method ends.

Referring now back to decision block 306, if the size of the current rank (RANK#) is larger than 2 GB, the method 300 proceeds to block 320. In block 320, the size of the current rank is divided by 2 GB (the amount of memory covered by a CRC entry) and assigned to the variable L, which represents the number of CRC entries from the BIOS CRC table that will be used to populate the 16 CRC entries associated with RANK# in the memory controller and DRAM CRC tables. For instance, if a rank is 16 GB, 8 CRC entries covering 2 GB each will be copied to the memory controller and DRAM CRC tables. Also in block 320, 16 (the number of banks in a rank) is divided by L and assigned to the variable M, which represents the number of sequential CRC entries in the memory controller and DRAM CRC tables that will receive the same CRC entry from the BIOS CRC table. For instance, if a bank is 1 GB, a 2 GB CRC entry from the BIOS CRC table will enable or disable CRC for two banks worth of memory. Further, in block 320, the counters N and P are set to 1. The method 300 then proceeds to block 322 where the contents of the current CRC entry (CRC_ENTRY#) are copied to the CRC entry associated with Bank(P) in RANK# in the CRC table in CONTROLLER#. Also, the contents of the current CRC entry are copied to the CRC entry associated with Bank (P) in the DRAM CRC tables in the DRAM chips that form RANK#. Next, in block 324, the counters N and P are incremented by 1. Then, in decision block 326, it is determined whether N is greater than M (i.e. whether all of the sequential CRC entries that need to receive the same CRC entry from the BIOS CRC table have done so). If not, then the method 300 returns to block 322 where the contents of CRC_ENTRY# is copied to another CRC entry in the CRC table in CONTROLLER# and associated DRAM chips. If N is greater than M, then method 300 proceeds to block 328 where CRC_EN- TRY# is incremented by one so that in the next loop the subsequent CRC entry in the hypervisor CRC table will be copied to the memory controller and DRAM CRC tables. Then, in decision block 330, it is determined whether P is greater than 16 (i.e. whether CRC entries for all banks associated with RANK# in the memory controller and DRAM CRC tables have been populated). If P is not greater than 16, method 300 returns to block 322 where the contents of the updated CRC_ENTRY# is copied to the memory controller and DRAM CRC tables. If P is greater than 16, the method continues to block 312 where RANK# is incremented by 1 and it is determined whether all ranks have been completed, as described above.

It is understood that the actions illustrated in the flow chart of FIG. 5 may, in alternative embodiments, be performed in a different order and may be modified depending on the granularity of the CRC entries in the hypervisor CRC table. For instance, if each CRC entry in the hypervisor CRC table covered 1 GB rather than 2 GB, the size of RANK# would be compared to 1 GB in decision block 306. Further, the method 300 may include different and/or additional blocks in some embodiments.

Figure 6:
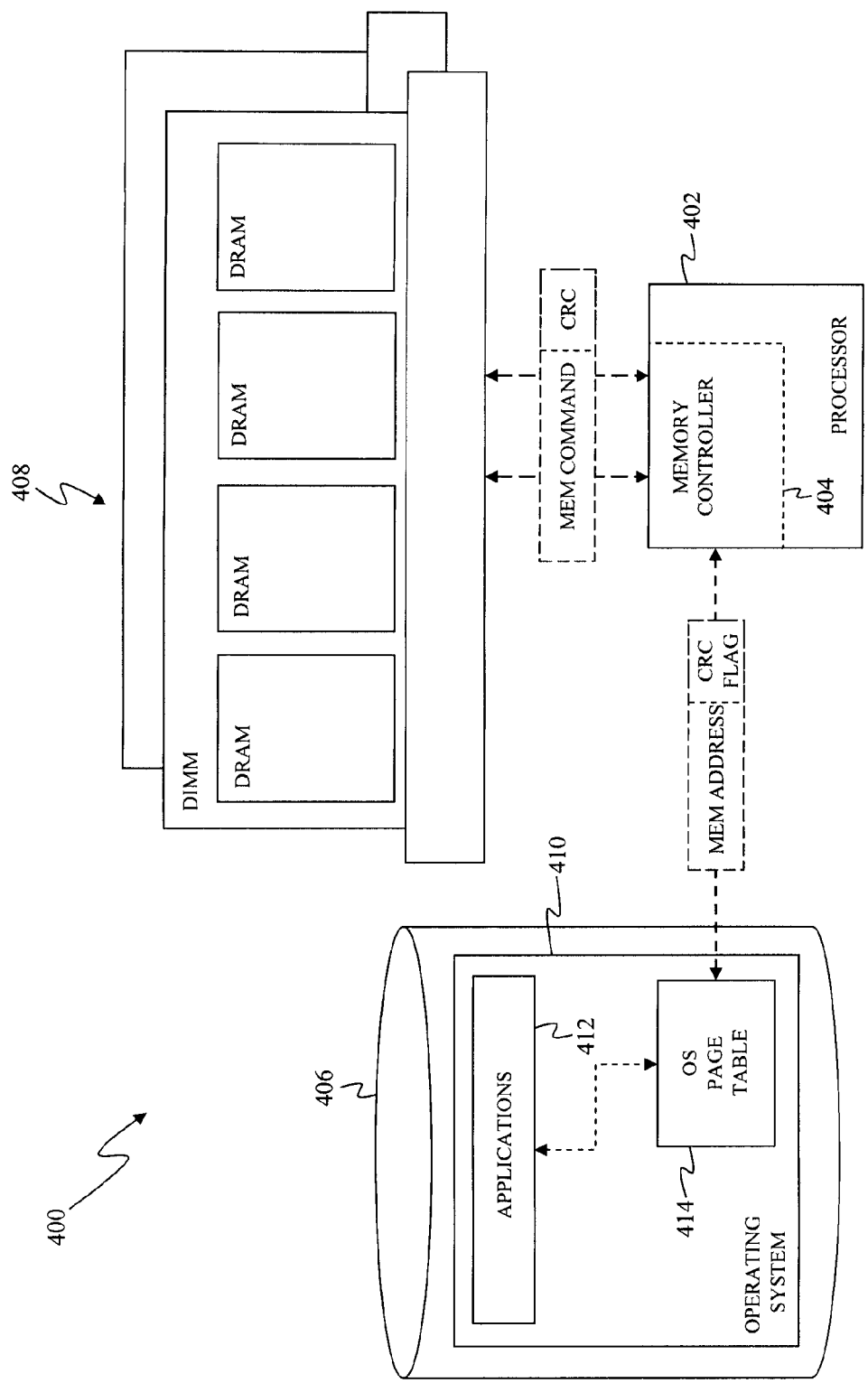
FIG. 6 is a functional block diagram of a portion of an IHS according to another embodiment of the present disclosure.

FIG. 6 is a functional block diagram of a portion of an IHS 400 according to another embodiment of the present disclosure. The IHS 400 is similar to the IHS 100 of FIGS. 1 and 2 in that it includes a processor 402, a memory controller 404, a mass storage device 406, and a system memory 408 and is operable to selectively enable error checking for data flowing to and from the system memory. In the illustrated embodiment of FIG. 6, the IHS 400 is operable to enable CRC error checking for data flowing between the memory controller 404 and system memory 408; however, it does so without the CRC tables in the memory controller 404 and DRAM chips that comprise the system memory. Instead, flags indicating whether CRC error checking should be enabled are passed from page tables referenced by software executing on the processor 402 to the memory controller and then on to the system memory.

In more detail, the IHS 400 includes an operating system 410 that provides resources for applications 412 executing therein. The operating system 410 includes a page table 414 that maps virtual memory addresses to physical memory addresses in system memory 408. The applications 412 request allocations of memory (pages) from the operating system through an application programming interface (API). Although the operating system 410 and applications 412 are shown as residing in storage device 406, it is understood that active portions of this software may reside in system memory 408. In the illustrated embodiment, when applications 412 request a page of memory from the operating system 410 they can indicate through the API whether the data in the page should be CRC protected when transmitted between the memory controller 404 and system memory 408. For example, an application may request CRC-protected pages for core application threads but request non-CRC-protected pages for temporary user data. To support this functionality, the page table 414 includes a CRC Flag that indicates whether each page of data controlled by the operating system should be CRC-protected or not. Thus, when the operating system 410 receives an API request for a CRC-protected page of data, it sets the CRC Flag to '1' for that page of data. An example page table 414 is shown in Table 4 below:

TABLE 4

| Page 0 | Virtual Address | Physical Address | Standard Tag | CRC Flag |
| Page 1 | Virtual Address | Physical Address | Standard Tag | CRC Flag |
| ... | ... | ... | ... | ... |
| Page N | Virtual Address | Physical Address | Standard Tag | CRC Flag |

As shown in FIG. 6, when the operating system 410 sends a memory access request to the memory controller 404, the CRC Flag bit is included with the translated physical address. As such, when the memory controller 404 receives the access request, it determines whether to enable CRC error checking for the page of memory indicated by the operating system based on the CRC Flag bit. It is understood that active portions of the page table may be stored in registers in the processor 402.

In the illustrated embodiment, when the memory controller 404 receives a CRC Flag bit of '1' from the operating system 410/processor 402, it is operable to enable CRC error checking on reads and writes to system memory 408 by setting an unused address bit in a data transfer command to '1'. For example, in a command to the system memory 408 that initiates a data read (e.g. a CAS command), the memory controller 404 may set the unused A13 bit to a '1' to indicate that the DRAM chips should generate a CRC checksum and append it to the requested data. Address bits such as the A13 bit may be utilized for this purpose because data transfer commands typically do not utilize all available address bits. This method of selectively enabling CRC error checking is described in more detail in association with FIGS. 7 and 8. Further, in alternative embodiments, the memory controller may coordinate CRC checksum generation and checking with the DRAM chips through methods besides setting unused command bits. For example, the IHS 400 may include a dedicated CRC message bus between the memory controller and the system memory that the memory controller would use to signal the DRAM chips to enable CRC error checking. Additionally, other types of software may selectively enable CRC error checking for critical and non-critical data. For instance, a hypervisor similar to hypervisor 150 in FIG. 2 may maintain a page table similar to page table 414 and update it according to whether virtual machines request CRC-protected pages of memory.

FIG. 7 is a flow chart illustrating a method 450 of selectively enabling CRC error checking when memory controller 404 receives a data read request. The method 450 begins at block 452 where the memory controller 404 receives a read request from the operating system 410. Then, in decision block 454, the memory controller 404 determines if the CRC Flag bit in the operating system request is set to '1'. If no, the memory controller, in block 456, sets an unused address bit (e.g. A13) in a data read command to 0 to disable CRC error checking. If yes, the memory controller, in block 458, sets the unused address bit to '1' to enable CRC error checking. The method then proceeds to block 460 where the memory controller 404 sends the data read command to the DRAM chips that contains the requested data. Then, in decision block 462, the DRAM chips receive the read command and determine if the unused address bit is set to '1'. If not, the DRAM chips, in block 464, retrieve the requested data and transmit it to the memory controller 404 without generating a CRC checksum. Then, in block 466, the memory controller receives the requested data and sends it to the processor 402 for processing. If, however, the unused address bit is set to '1' in block 462, the method 450 proceeds to block 468, where the DRAM chips retrieve the requested data, generate a CRC checksum based upon it, and append the checksum to the data before sending it back to the memory controller. Next, in blocks 470 and 472, the memory controller 404 receives the data and determines whether the data was corrupted using the checksum. If the data is corrupted, the memory controller signals an exception and some recovery action is taken such as retrying the read. If the data is uncorrupted based on the CRC error check, the method proceeds to block 466 where the requested data is sent to the processor 402.

FIG. 8 is a flow chart illustrating a method 480 of selectively enabling CRC error checking when memory controller 404 receives a data write request. The method 480 begins at block 482 where the memory controller 404 receives a write request and data from the processor 402. Next, in decision block 484, the memory controller 404 determines if the CRC Flag bit in the write request is set to '1'. If no, the memory controller, in block 486, sets an unused address bit (e.g. A13) in a data write command to 0 to disable CRC error checking. If yes, the memory controller 404, in blocks 488 and 490, sets the unused address bit to '1' to enable CRC error checking and generates a CRC checksum based on the data to be written. The method then proceeds to block 492 where the memory controller 404 sends the data write command to the appropriate DRAM chips. Then, in decision block 494, the DRAM chips receive the write command and determine if the unused address bit is set to '1'. If not, the DRAM chips, in block 496, write the data to the address specified by the operating system. If, however, the unused address bit is set to '1' in block 494, the method 480 proceeds to blocks 498 and 500, where the DRAM chips receive the data and checksum and verify the data using the checksum. If the data is corrupted, the DRAM(s) signal an exception to the memory controller and some recovery action is taken such as retrying the write process. If the data is uncorrupted based on the CRC error check, the method 480 proceeds to block 496 where the data is written to the system memory 408.

It is understood that the methods illustrated in the flow charts of FIGS. 7 and 8 may, in alternative embodiments, be performed in a different order and may include different and/or additional blocks in some embodiments. For example, the CRC Flag may include two bits—a read bit and a write bit that may signal to the memory controller to independently enable or disable CRC error checking for reads and writes.

Additionally, the methods described in FIGS. 7 and 8 of selectively enabling CRC error checking by setting an unused bit in a data access command may be applied to the system and method described in association with FIGS. 2-4. For example, in some embodiments, the DRAM chips 182, 184, 186, 188 of FIG. 2 may selectively enable CRC error checking for data reads based upon an unused bit in the read command as described above, rather than based upon a CRC entry in DRAM CRC tables. In such a scenario, CRC tables would not be created in the DRAM chips during memory initialization and the memory controller would set the unused bit in memory access commands based upon the CRC entries in the memory controller CRC table.

Figure 9:
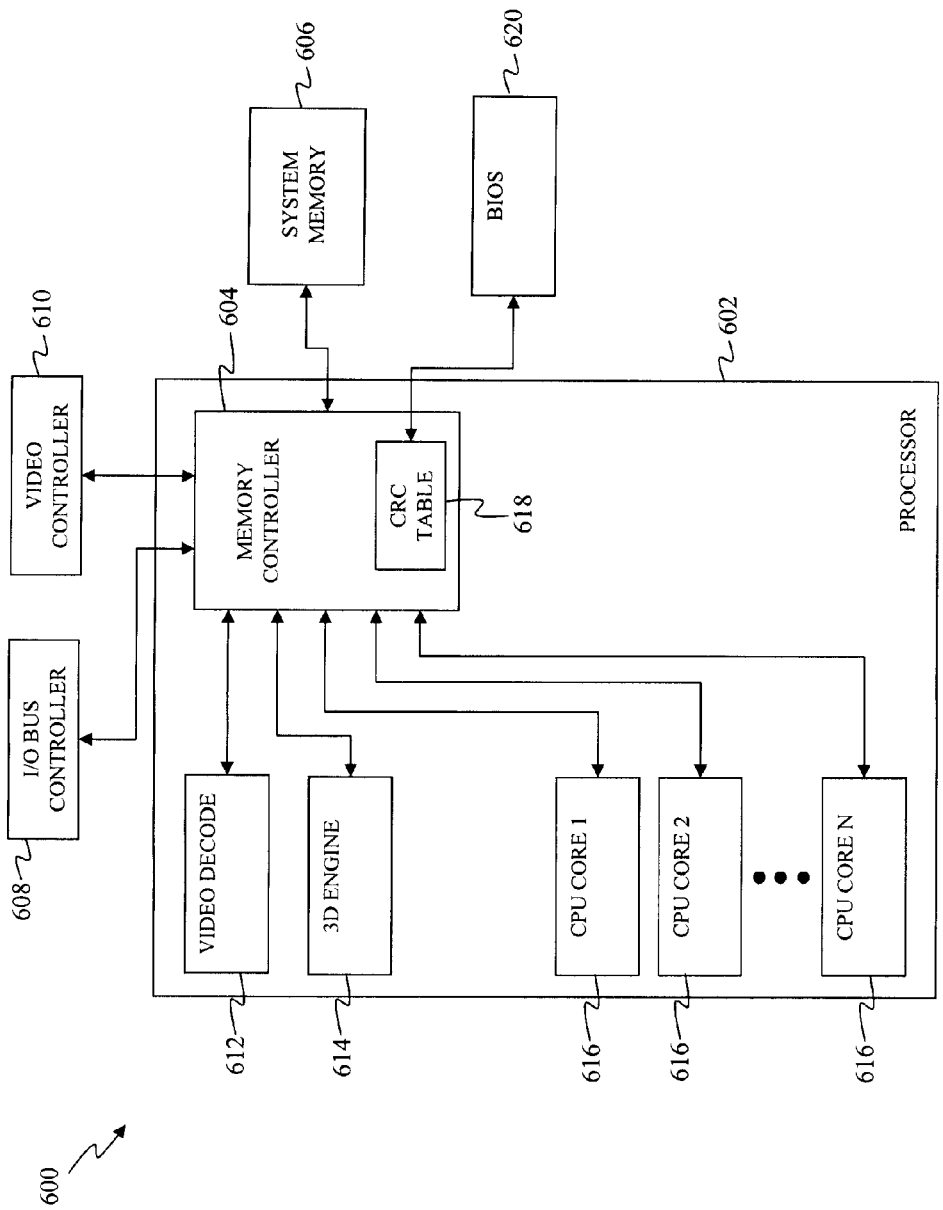
FIG. 9 is a functional block diagram of a portion of an IHS according to yet another embodiment of the present disclosure.

FIG. 9 is a functional block diagram of a portion of an IHS 600 according to yet another embodiment of the present disclosure. The IHS 600 is similar to the IHS 100 of FIGS. 1 and 2 in that it includes a processor 602, a memory controller 604, and a system memory 606 and is operable to selectively enable error checking for data flowing to and from the system memory. The IHS 600 further includes an I/O bus controller 608 such as a Universal Serial Bus (USB) controller and a video controller 610 that each request system memory via the memory controller 604. The processor 602 includes a plurality of functional units such as a video decode unit 612, a three-dimensional (3D) rendering engine, and a plurality of CPU cores 616. The processor routes memory accesses for these units to the memory controller 604. In the illustrated embodiment, the IHS 600 is operable to selectively enable CRC error checking for each device that accesses system memory through the memory controller 604 (i.e. any unit in IHS 600 that has a destination ID assigned by the memory controller). To this end, the memory controller 604 includes a CRC table 618 in an onboard register that denotes whether to enable CRC error checking for each functional unit. Thus, when the memory controller 604 receives a memory access request, it determines from which functional unit in the IHS the request originated, and selectively enables error checking based on the CRC table 618. For instance, the memory controller 604 may enable CRC error checking for data critical to the operation of IHS 600 such as data flowing to and from the CPU cores 616 but not for non-critical data such as data flowing to and from the video decode unit 612 or the I/O bus controller. In such a scenario, entries in the CRC table 618 corresponding to the CPU cores would have a CRC Flag set to '1' while entries corresponding to the video decode unit and I/O bus controller would have their CRC Flags set to '0'. The entries in the CRC table 618 are populated by the BIOS memory initialization code in BIOS 620 during system boot up and, in some embodiments, may be updated by an operating system as needed. An update by the operating system corresponding to a specific functional unit may occur when the functional unit is idle. In some embodiments, the CRC table is user configurable through a BIOS user interface or through operating system-based configuration tools. Further, in the illustrated embodiment, when the memory controller 604 is accessing data for a CRC-protected functional unit, it enables CRC error checking using the methods described in the FIGS. 7 and 8. That is, it sets an unused address bit in data access commands to coordinate CRC checksum generation and checking with the DRAM chips. In alternative embodiments, however, the memory controller may implement CRC checking in a different manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of selectively enabling error checking in an information handling system (IHS) that includes a memory controller and a system memory, comprising:

receiving, at the memory controller, data segmentation information that is based upon the use of data in the IHS and that indicates that data that is associated with a first memory portion in the system memory that supports error checking should be subject to error checking during transmission between the memory controller and the first memory portion of the system memory, while data associated with a second memory portion in the system memory that supports error checking should be free of error checking during transmission between the memory controller and the second memory portion of the system memory;

receiving, at the memory controller, a memory access request directed to one of the first memory portion and the second memory portion;

transmitting data between the memory controller and the system memory in response to the memory access request; and selectively performing an error checking technique on the transmitted data based on the data segmentation information, wherein the selectively performing includes performing the error checking technique if the memory access request is directed to the first memory portion, and wherein the selectively performing includes transmitting the data without performing the error checking technique if the memory access request is directed to the second memory portion.

2. The method of claim 1, wherein the performing the error checking technique includes performing a cyclic redundancy check (CRC).

3. The method of claim 1, wherein the data segmentation information originates from system management software executing on the IHS, and wherein the first memory portion and the second memory portion are portions of the system memory allocated to the system management software.

4. The method of claim 3, wherein the system management software is one of operating system software and hypervisor software.

5. The method of claim 1, wherein the receiving the data segmentation information includes storing in a memory controller register a first data segmentation entry corresponding to the first memory portion and a second data segmentation entry corresponding to the second memory portion, the first data segmentation entry indicating that data associated with the first memory portion in the system memory should be subject to error checking, and the second data segmentation entry indicating that data associated with the second memory portion in the system memory should be free of error checking.

6. The method of claim 5, further comprising:
storing in a register in the system memory copies of the first data segmentation entry and the second data segmentation entry;
wherein the selectively performing the error checking technique includes selectively performing the error checking technique based on the copies of the first data segmentation entry and the second data segmentation entry.

7. The method of claim 1,
wherein the data segmentation information associates the first memory portion in the system memory with a first functional unit in the IHS and associates the second memory portion in the system memory with a second function unit in the IHS that is different than the first functional unit;
wherein the memory access request originates from one of the first functional unit and the second functional unit;
wherein the method further comprises determining from which of the first functional unit and second functional unit the memory access request originated; and
wherein the selectively performing the error checking technique is based both on the data segmentation information and the determination of which functional unit the memory access request originated.

8. The method of claim 1, wherein receiving the data segmentation information includes receiving a flag with the memory access request, and wherein the flag indicates whether data associated with memory portions identified by the memory access request should be subject to error checking during transmission between the memory controller and the system memory.

9. A method of selectively enabling error checking in an information handling system (IHS) that includes a memory controller, a system memory, and a basic input/output system (BIOS), comprising:

receiving, at the BIOS, a plurality of data segmentation entries that are based upon the use of data in the IHS, each data segmentation entry in the plurality of data segmentation entries corresponding to a respective portion of the system memory that supports error checking and that is allocated by system management software executing within the IHS, and each data segmentation entry indicating whether data associated with the respective portion of the system memory that supports error checking should be subject to error checking during transmission between the memory controller and the system memory;
copying, with the BIOS, a set of the data segmentation entries to a register in the memory controller, the set of the data segmentation entries corresponding to portions of the system memory controlled by the memory controller;
copying, with the BIOS, the set of the data segmentation entries to registers in a plurality of memory chips in the system memory, the plurality of memory chips containing those portions of the system memory controlled by the memory controller;
receiving, at the memory controller, a memory access request identifying a memory portion from the system management software;
transmitting data between the memory controller and the system memory in response to the memory access request; and
selectively performing an error checking technique on the transmitted data based upon the set of the data segmentation entries in the memory controller and based upon the set of the data segmentation entries in the plurality of memory chips.

10. The method of claim 9, wherein the selectively performing the error checking technique includes:
reading a data segmentation entry in the memory controller register that corresponds to the identified memory portion in the memory access request;
performing a cyclic redundancy check (CRC) on the transmitted data if the data segmentation entry indicates that data associated with the identified memory portion should be subject to error checking; and
transmitting the transmitted data without performing a CRC if the data segmentation entry indicates that data associated with the identified memory portion should be free of error checking.

11. The method of claim 9, wherein the receiving the plurality of data segmentation entries, the copying the set of the data segmentation entries to the register in the memory controller, and the copying the set of the data segmentation entries to registers in the plurality of memory chips are performed during memory initialization of the IHS, the memory initialization being performed by memory initialization code stored on the BIOS.

12. The method of claim 9, wherein the system management software is one of operating system software and hypervisor software.

13. The method of claim 9, wherein the copying the set of data segmentation entries to registers in a plurality of memory chips includes, for each data segmentation entry in the set of data segmentation entries, determining a memory rank to which the respective portion of system memory corresponding to the data segmentation entry belongs and copying the data segmentation entry to registers in each of the memory chips that form the memory rank.

14. The method of claim 9, wherein the data segmentation entries include a first bit and second bit, the first bit indicating whether the error checking technique should be performed on data read from the respective portion of the system memory corresponding to the data segmentation entry, and the second bit indicating whether the error checking technique should be performed on data written to the respective portion of the system memory corresponding to the data entry.

15. An information handling system (IHS), comprising:
a system memory having a first memory portion that supports error checking and that is addressable by a first address range, and a second memory portion that supports error checking and that is addressable by a second address range;
a memory controller communicatively coupled to the system memory and configured to transfer data therebetween, the memory controller including data segmentation information indicating that data associated with the first memory portion that supports error checking should be subject to error checking during transmission between the memory controller and the system memory, while data associated with the second memory portion that supports error checking should be free of error checking during transmission between the memory controller and the system memory; and
a processor having system management software executing thereon, the system management software being configured to generate the data segmentation information based on the use of data in the IHS, wherein the system management software is also configured to send a memory access request to the memory controller to access data in one of the first memory portion and the second memory portion;
wherein the memory controller is further configured to transmit data between the memory controller and the system memory in response to the memory access request and selectively perform an error checking technique on the transmitted data based on the data segmentation information.

16. The IHS of claim 15, wherein the system management software is one of operating system software and hypervisor software.

17. The IHS of claim 15, wherein the error checking technique is a cyclic redundancy check (CRC).

18. The IHS of claim 15, wherein the data segmentation information includes a first data system management software entry corresponding to the first memory portion and a second data system management software entry corresponding to the second memory portion, the first data system management software entry indicating that data associated with the first memory portion in the system memory should be subject to error checking during transmission between the memory controller and the system memory, and the second system management software data entry indicating that data associated with the second memory portion in the system memory should be free of error checking during transmission between the memory controller and the system memory.

19. The IHS of claim 18, further including a basic input/output system (BIOS) executing on the processor and configured to copy the first data system management software entry and the second data system management software entry from the system management software to a register in the memory controller.

20. The IHS of claim 15,
wherein the processor is further configured to send the data segmentation information to the memory controller in the memory access request; and
wherein the data segmentation information includes a flag indicating whether data associated with memory portions identified by the memory access request should be subject to error checking during transmission between the memory controller and the system memory.

* * * * *